(12) United States Patent
Schmidt

(10) Patent No.: US 6,968,353 B2
(45) Date of Patent: Nov. 22, 2005

(54) INTERPOLATOR AND INTERPOLATION METHOD WHEN INTERPOLATING A DIGITAL INPUT SIGNAL SEQUENCE AT INTERPOLATION INSTANTS PRESCRIBED BY A CONTROL SIGNAL

(75) Inventor: Kurt Schmidt, Grafing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 590 days.

(21) Appl. No.: 10/091,037

(22) Filed: Mar. 6, 2002

(65) Prior Publication Data

US 2002/0133524 A1 Sep. 19, 2002

(30) Foreign Application Priority Data

Mar. 14, 2001 (DE) .................. 101 12 275

(51) Int. Cl.[7] ........................................... G06F 17/17
(52) U.S. Cl. ................................................ 708/313
(58) Field of Search ........................... 708/313; 341/61

(56) References Cited

U.S. PATENT DOCUMENTS

| | | | | |
|---|---|---|---|---|
| 5,274,372 A | * | 12/1993 | Luthra et al. ................ | 341/61 |
| 5,717,617 A | * | 2/1998 | Chester ...................... | 708/313 |
| 6,487,573 B1 | * | 11/2002 | Jiang et al. ................. | 708/313 |

FOREIGN PATENT DOCUMENTS

| | | |
|---|---|---|
| DE | 197 43 663 A1 | 4/1999 |
| DE | 198 42 421 A1 | 12/1999 |
| DE | 199 19 575 C1 | 1/2001 |
| DE | 199 40 926 A1 | 3/2001 |
| EP | 0 695 032 A1 | 7/1994 |
| EP | 0 696 848 A1 | 8/1994 |
| EP | 0 665 546 A2 | 1/1995 |
| EP | 1 039 636 A2 | 9/2000 |

OTHER PUBLICATIONS

Fliege, N., "Multiraten-Signalverarbeitung: Theorie und Anwendungen", pp. 70-75 and 124-140.

* cited by examiner

*Primary Examiner*—Tan V. Mai
(74) *Attorney, Agent, or Firm*—Harness, Dickey & Pierce, P.L.C.

(57) ABSTRACT

An interpolator includes a half band filter, a first polyphase filter, a second polyphase filter and a linear interpolation filter. The polyphase filters, respectively, interpolate before and after an interpolation instant $(\Delta)t/T_{r1}$ prescribed by a control signal (S).

10 Claims, 5 Drawing Sheets

INTERPOLATOR AND INTERPOLATION METHOD WHEN INTERPOLATING A DIGITAL INPUT SIGNAL SEQUENCE AT INTERPOLATION INSTANTS PRESCRIBED BY A CONTROL SIGNAL

This application claims priority to German Patent Application 101 12 275.6, filed Mar. 14, 2001, the entire contents of which are hereby incorporated by reference.

BACKGROUND OF THE INVENTION

1. Field of the Invention

The invention relates to an interpolator with fractionally adjustable interpolation instants. For example, such an interpolator is used in a resampler.

2. Related Art

A resampler with a corresponding interpolator is disclosed in EP 0 665 546 A2. In that case, the interpolator comprises two FIR filters with a corresponding coefficient memory. What is disadvantageous in the known interpolator is that it is designed in only one stage. If a high accuracy is demanded, the phase step size of the interpolator must be relatively small, so that a relatively large number of coefficients have to be stored in the coefficient memory, namely a complete set of coefficients for each phase step size. This leads to a high memory outlay and, in the case of monolithic integration of the resampler, to a large chip area for the coefficient memory. Furthermore, the memory access time is relatively long, as a result of which the processing speed is reduced.

SUMMARY OF THE INVENTION

The present invention is based on an object of specifying an interpolator and an interpolation method with which high interpolation accuracy may be realized in conjunction with a relatively low memory outlay.

This object, and other objects of the present invention, is achieved by way of an interpolator and by way of an interpolation method.

The present invention is based on the approach of performing an interpolation in the center of the sampling period of the input signal sequence in a half band filter, and thus halving the sampling periods of the input signal sequence. Therefore, given the same accuracy, the number of phase steps of the polyphase filters connected downstream only has to be half as large as without the half band filter connected upstream. The memory outlay for the coefficients of the polyphase filters is already halved by this measure. A further reduction of the memory outlay results from the linear interpolation connected downstream.

On account of the fact that two polyphase filters are used, one polyphase filter interpolating in the pattern of the predetermined phase steps before the interpolation instant and the other polyphase filter interpolating in the pattern of the phase steps after the interpolation instant, and the further fact that the linear interpolation filter interpolates linearly between the two interpolation results of the two polyphase filters, the accuracy is increased. Moreover, on account of the linear interpolation connected downstream, therefore, it is possible to reduce the phase step width in the polyphase filters, as a result of which the memory outlay is reduced. A further considerable advantage includes the fact that significantly fewer multipliers have to be present in the polyphase filters in order to achieve the same interpolation accuracy.

In order to limit the bandwidth, a second half band filter may be connected upstream.

In order not to have to perform an increase in the processing clock rate in the polyphase filters despite the up-sampling in the first half band filter, the even-numbered output values of the first half band filter may be fed to a first series of serially arranged delay elements, while the odd-numbered output values of the first half band filter are fed to a second series of serially arranged delay elements. The multipliers of the polyphase filters are alternately connected to the first series and second series of delay elements via a changeover device (multiplexer).

If the interpolation instant lies between the last phase step of the polyphase filter and the next sampling instant, then the output signal sequence of the first half band filter shifted by a sampling period must be fed to one of the two polyphase filters. This may be done by way of the changeover device (multiplexer), which in this case accesses the series of delay elements in a manner offset by one delay element.

BRIEF DESCRIPTION OF THE DRAWINGS

An exemplary embodiment of the present invention is described in more detail below with reference to the drawings, in which.

DETAILED DESCRIPTION OF THE PREFERRED EMBODIMENTS

Figure 1:
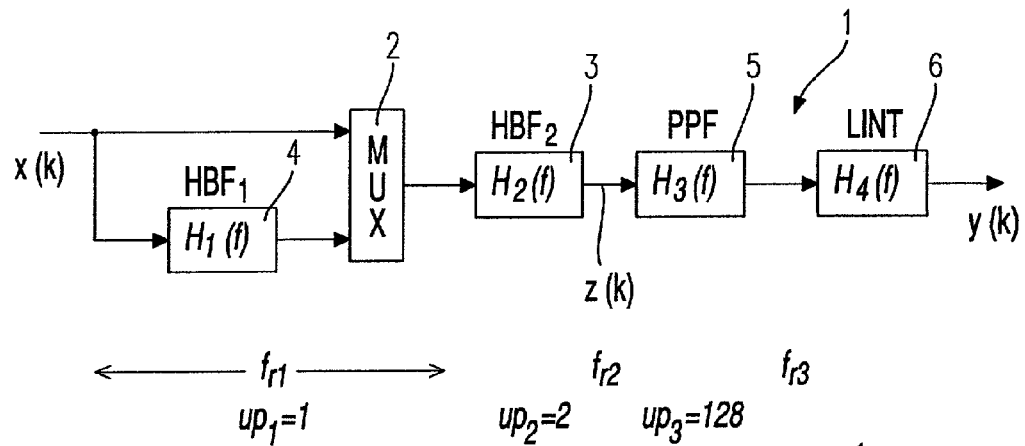
FIG. 1 illustrates a block diagram of an interpolator according to the present invention.

FIG. 1 illustrates a block diagram of an interpolator 1 according to the present invention. Via a changeover device (multiplexer MUX) 2, a digital input signal sequence x(k) can optionally be passed directly to a first half band filter (HBF$_2$) 3 or indirectly, via a second half band filter (HBF$_1$) 4 to the first half-band filter 3. The second half band filter 4 has a transfer function H$_1$(f) and does not change the sampling rate (up-sampling factor up$_1$=1). The first half band filter 3 has a transfer function H$_2$(f) and increases the sampling rate by the factor 2 (up-sampling factor up$_2$=2). The first half band filter 3 generates an intermediate signal sequence z(k)

A polyphase filter (PPF) 5 is connected downstream of the first half band filter 3. As can be seen from FIG. 4, the polyphase filter 5 is subdivided into a first polyphase filter 5a and second polyphase filter 5b, which in each case has the transfer function $H_3(f)$ and increases the sampling rate by, for example, a factor 128 (up-sampling factor $up_3=128$).

A linear interpolation filter (LINT) 6 having the transfer function $H_4(f)$ is connected downstream of the polyphase filter 5. The output signal sequence y(k) is available at the output of the linear interpolation filter 6.

Figure 2:
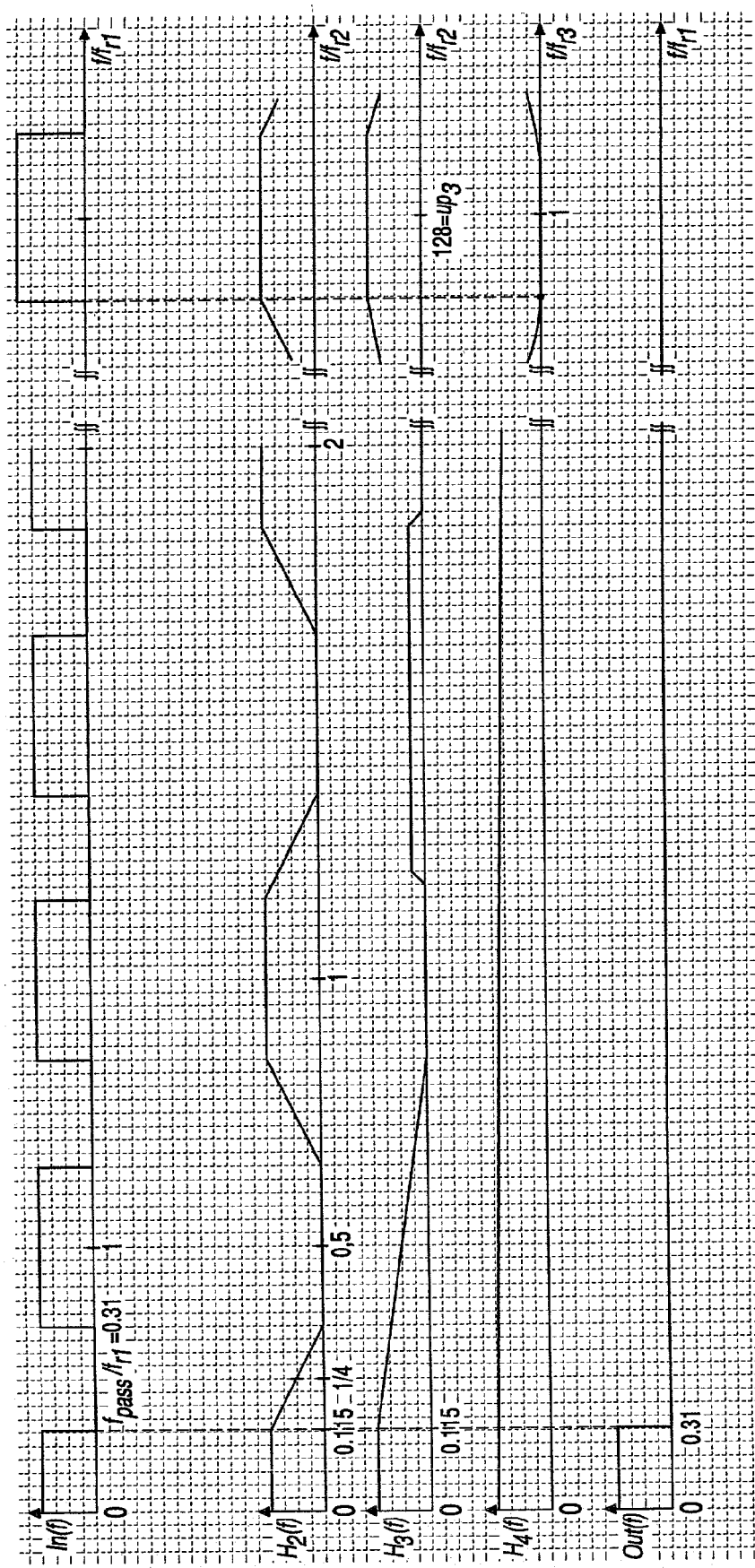
FIG. 2 illustrates a spectrum of the input signal and of the output signal together with transfer functions of a first half band filter, of the polyphase filter and of a linear interpolation filter.

FIG. 2 illustrates a permissible spectrum In(f)—with regard to the bandwidth—of the input signal sequence x(k) together with the transfer functions $H_2(f)$ of the first half band filter 3, $H_3(f)$ of the polyphase filter 5 and $H_4(f)$ of the linear interpolation filter 6. The spectrum Out(f) of the output signal sequence y(k) is produced by multiplying the input spectrum In(f) by the transfer functions $H_2(f)$, $H_3(f)$ and $H_4(f)$. In this case, the changeover device 2 is switched in such a way that the second half band filter 4 is bypassed.

As is known, the transfer function $H_2(f)$ of the half band filter 3 is symmetrical with regard to $f/f_{r2}=0.25$, the ramp beginning at $0.31\ f_{r1}$ or $0.115\ f_{r2}$. In this case, $f_{r1}$ is the sampling period of the input signal sequence x(k) and $f_{r2}$ is the sampling period of the intermediate signal sequence z(k) at the output of the first half band filter 3. While the Fourier transform of the input signal sequence x(k) is periodically repeated at the interval $f_{r1}$, the transfer function $H_2(f)$ is periodically repeated at the interval $f_{r2}$.

The transfer function $H_3(f)$ of the polyphase filter 5 has a ramp which likewise begins at $0.31 \cdot f_{r1}$ or $0.115 \cdot f_{r2}$ and is periodic at $f_{r3}=128 \cdot f_{r2}$. Parasitic passbands occur in between, but they lie in spectral ranges in which the transfer function $H_2(f)$ of the first half band filter 3 blocks. The task of the transfer function $H_3(f)$ includes suppressing the repetition spectra of $H_2(f)$.

The transfer function $H_4(f)$ of the linear interpolation filter 6 falls continuously and reaches a zero point at $f/f_{r3}=1$. Consequently, the transfer function $H_4(f)$ of the linear interpolation filter 6 blocks where the passbands of the transfer functions $H_2(f)$ and $H_3(f)$ coincide at $f/f_{r3}=1$. As long as the bandwidth $f_{pass}$ of the input signal sequence x(k) is smaller than $0.31 \cdot f_{r1}$, the input signal sequence x(k) is mapped onto the output signal sequence y(k) in a manner free from distortion and interference.

Figure 3:
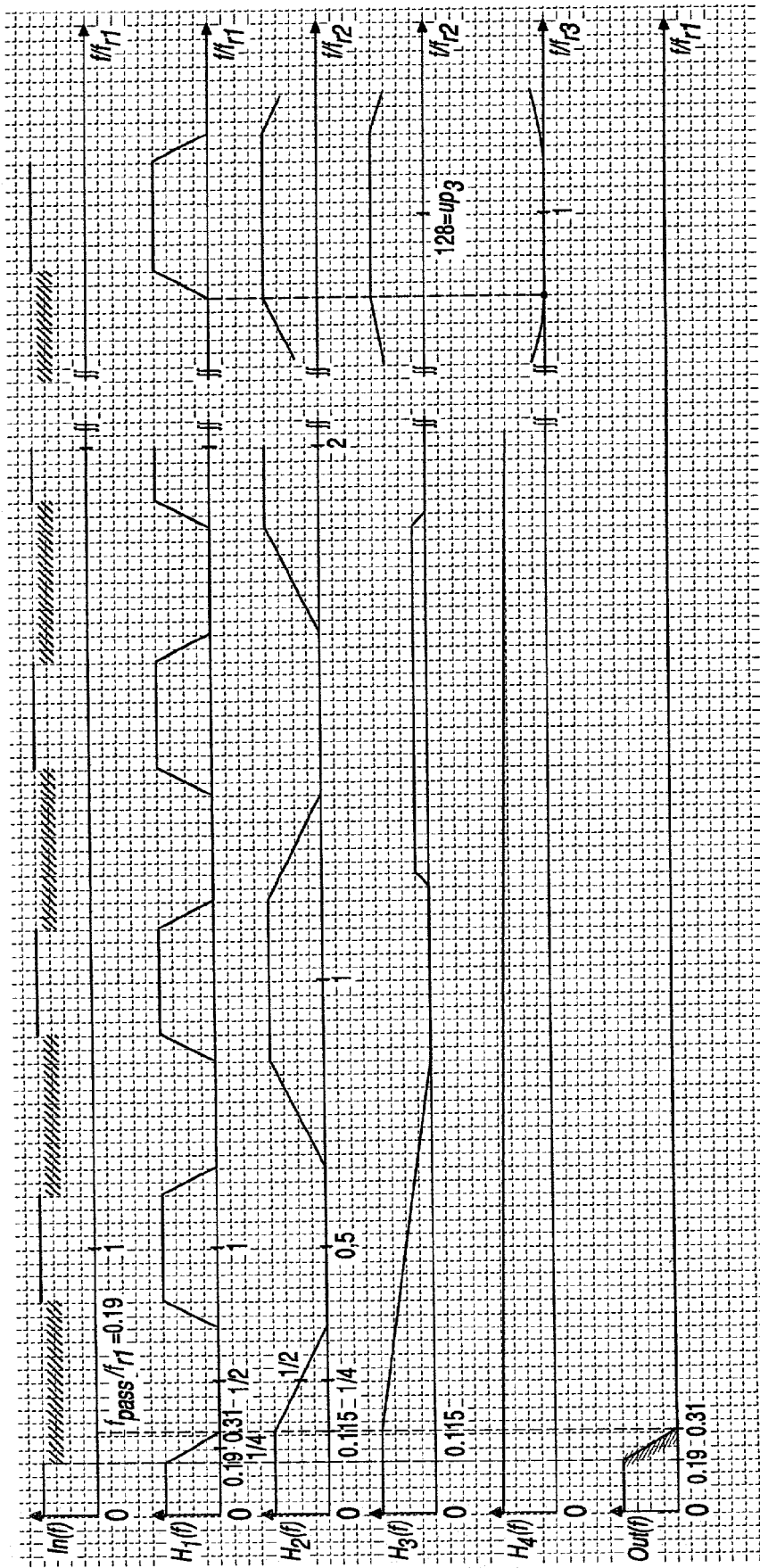
FIG. 3 illustrates the spectrum of the input signal and of the output signal together with the transfer functions of the second half band filter, of the first half band filter, of the polyphase filter and of the linear interpolation filter.

If the input signal sequence x(k) is not band-limited, the second half band filter 4 is to be connected upstream, the transfer function $H_1(f)$ of which is illustrated in FIG. 3. The transfer function $H_1(f)$ of the second half band filter 4 has a ramp which begins at $0.19 \cdot f_{r1}$ and reaches its zero point at $0.31 \cdot f_{r1}$. Consequently, the second half band filter 4 performs band limiting to the frequency range in which the transfer function $H_2(f)$ of the first half band filter 3 is constant.

Figure 4:
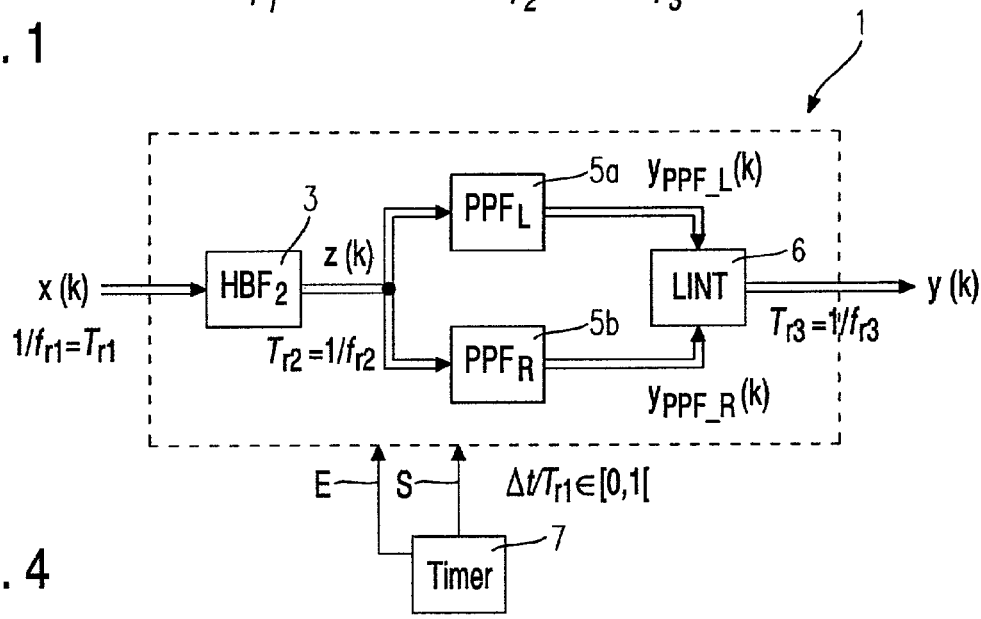
FIG. 4 illustrates a further block diagram of the interpolator according to the present invention.

FIG. 4 shows a somewhat more detailed block diagram of the interpolator 1 without the second half band filter 4 and without the changeover device 2. It can be seen from FIG. 4 that a first polyphase filter Sa and a second polyphase filter 5b are connected downstream of the first half band filter 3, both the interpolation value $y_{PPF\_L}(k)$ of the first polyphase filter 5a and the interpolation value $y_{PPF\_R}(k)$ of the second polyphase filter 5b being fed to the linear interpolation filter 6. The interpolation instant $\Delta t/T_{r1}$ relative to the sampling period $T_{r1}=1/f_{r1}$ of the input signal sequence x(k) is prescribed by a control signal S generated by a timer 7.

Figure 5:
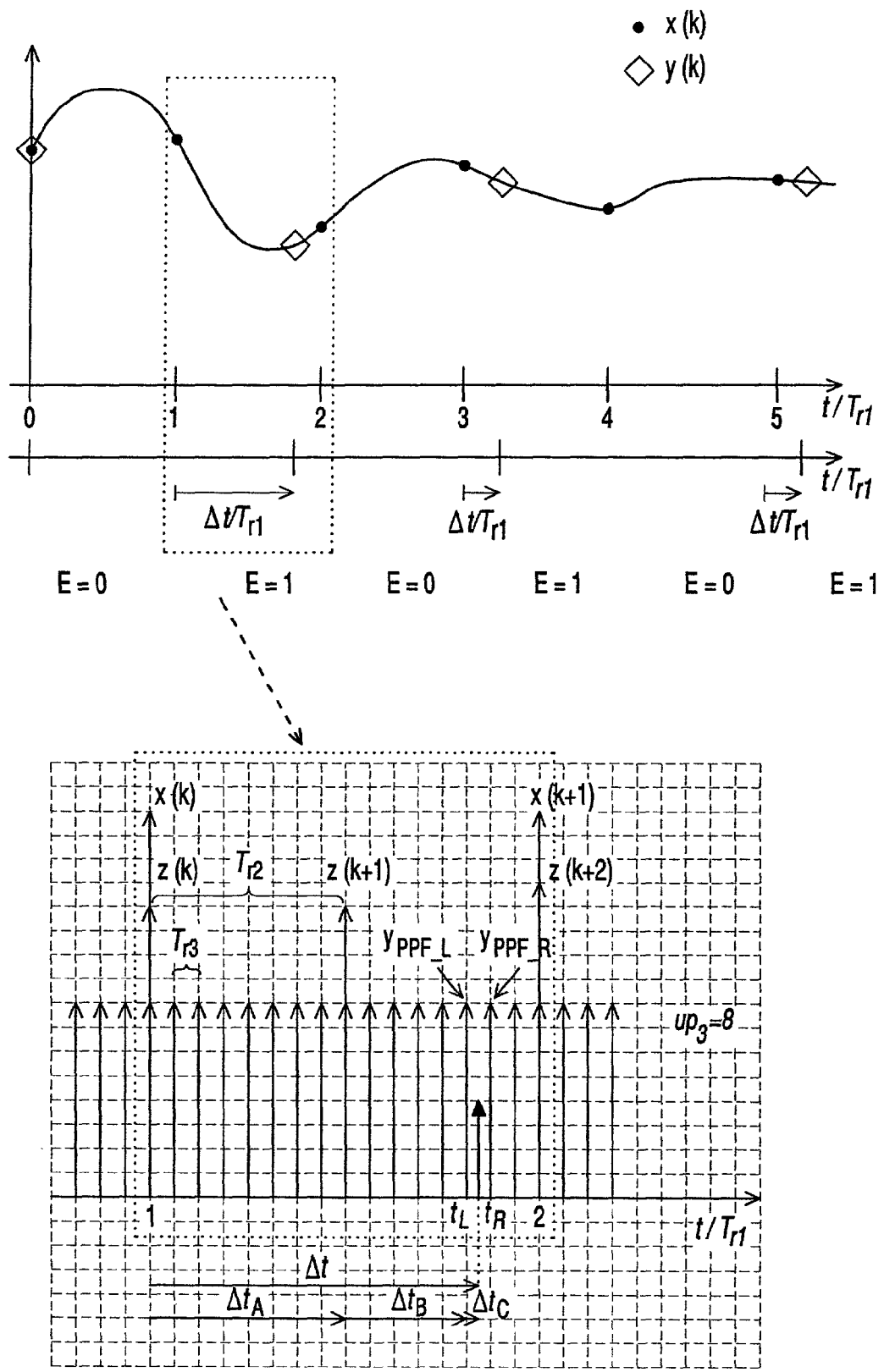
FIG. 5 illustrates a diagram for elucidating the interpolation method according to the present invention.

The interpolation method according to the present invention is diagrammatically illustrated in FIG. 5. An analog signal represented as a function of time is sampled at the instants $k \cdot T_{r1}$. These samples form the input signal sequence x(k). The input signal sequence x(k) is represented by filled-in circles in FIG. 5. In the example illustrated, the sampling instant is intended to be reduced by the resampler. Consequently, the interval between the sampling instants of the output signal sequence y(k) is larger, as illustrated in FIG. 5. The task of the interpolator 1 is to interpolate the amplitude values at the sampling instants of the output signal sequence y(k), which are represented as rhombi in FIG. 5, from the input signal sequence x(k). The interpolation instant $\Delta t/T_{r1}$ in relation to the preceding sampling instant of the input signal sequence x(k) is transferred by the timer 7 to the interpolator 1 by way of the control signal S. Furthermore, an enable signal E is transferred, which indicates whether or not a value of the output signal sequence y(k) is to be interpolated in the respective sampling interval of the input signal sequence x(k).

During the interpolation, the procedure according to the present invention is such that, in the first half band filter 3, an interpolation is in each case performed in the center of each sampling period $T_{r1}$ of the input signal sequence x(k) and an intermediate signal sequence z(k) is thus generated. Since the interpolation is always effected in the center of the sampling period $T_{r1}$, that is to say with an always identical phase shift in relation to the input signal sequence x(k), the complexity in the half band filter 3 is limited insofar as the half band filter 3 can operate with fixed coefficients. Given the same phase step size $T_{r3}$, however, the number of phase steps in relation to the sampling period $T_{r2}$ of the intermediate signal sequence z(k) is only half as large as in relation to the sampling period $T_{r1}$ of the input signal sequence x(k). Consequently, only half as many coefficients have to be kept ready in the coefficient memory of the polyphase filters 5a and 5b, which means that the memory outlay is halved for the same accuracy. Moreover, significantly fewer multipliers are required in the polyphase filters 5a and 5b.

The first polyphase filter 5a interpolates the intermediate signal sequence z(k) at an instant $t_L$ which lies in the predetermined pattern of possible interpolation instants of the polyphase filters before the interpolation instant $\Delta t$ prescribed by the control signal S. By contrast, the second polyphase filter 5b interpolates the intermediate signal sequence z(k) at an instant $t_R$ which lies in the predetermined pattern of possible interpolation instants after the interpolation instant $\Delta t$ prescribed by the control signal S.

Finally, a linear interpolation between the two interpolation values $y_{PPF\_L}$ and $y_{PPF\_R}$ found at the instant $t_L$ and $t_R$ is effected in the linear interpolation filter 6. The final interpolation value $y_{LINT}$ is found by way of the subsequent linear interpolation.

Figure 7:
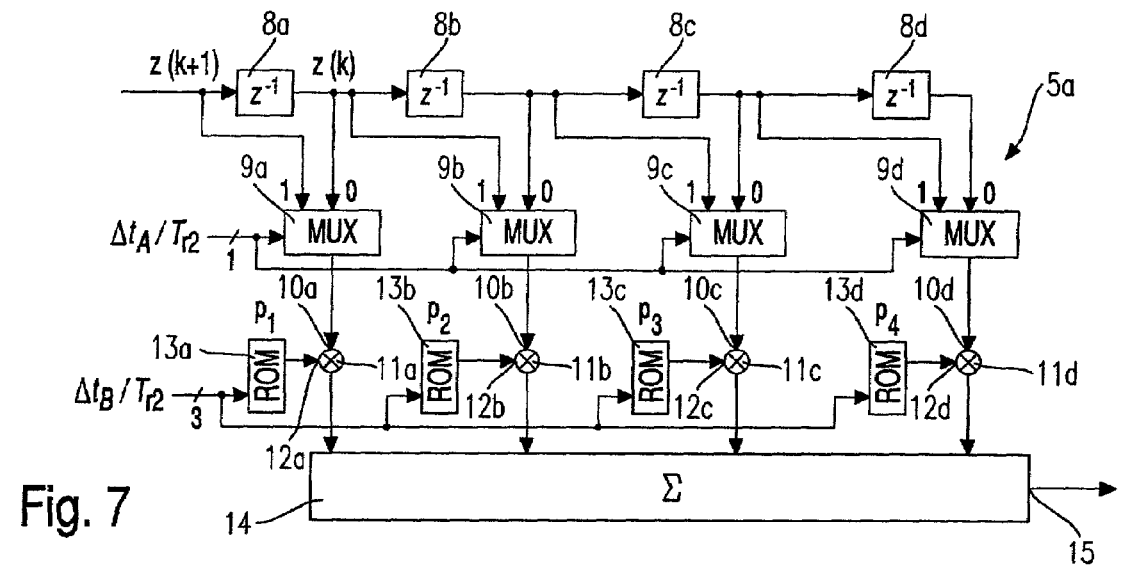
FIG. 7 illustrates a block diagram of a first exemplary embodiment of a polyphase filter of the interpolator according to the present invention.

FIG. 7 shows an exemplary embodiment of the polyphase filter 5a, which is identical to the polyphase filter 5b. A series of delay elements (registers) 8a, 8b, 8c and 8d can be seen. A greatly simplified example with only four delay elements 8a–8d is illustrated in this case. The delay elements 8a–8d are respectively connected via a changeover device (multiplexer MUX) 9a, 9b, 9c and 9d to a respective first input 10a, 10b, 10c and 10d of a multiplier 11a, 11b, 11c and 11d, respectively. The second input 12a, 12b, 12c and 12d of the multiplier 11a, 11b, 11c and 11d, respectively, is connected to the coefficient memory 13a, 13b, 13c and 13d, respectively. The control signal $)t_B/T_{r2}$ prescribes the phase step for which the polyphase filter 5a is to interpolate.

Figure 6:
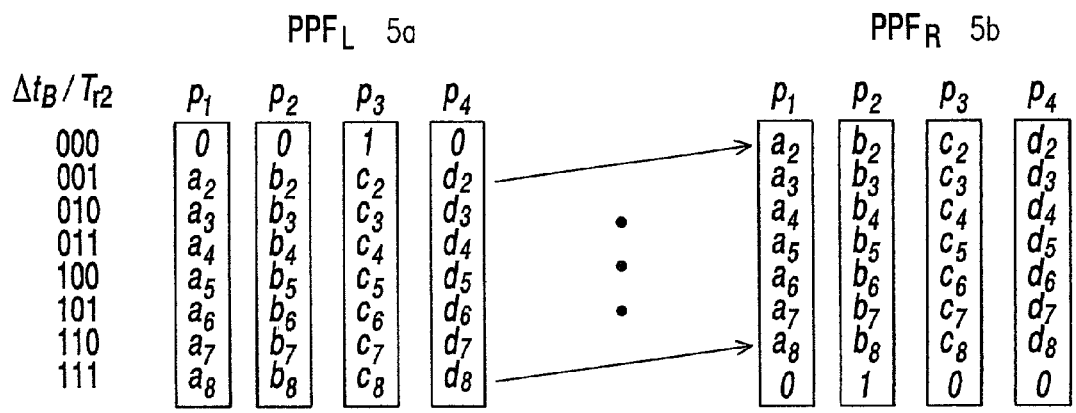
FIG. 6 illustrates the coefficients of the two polyphase filters as a function of the phase step.

In the greatly simplified exemplary embodiment illustrated in FIGS. 5 and 7, the sampling period $T_{r2}$ of the intermediate signal sequence z(k) is subdivided into eight phase steps, i.e. the polyphase filter 5a can interpolate in a pattern of eight possible interpolation instants. The phase step number can therefore be represented by three bits, as is illustrated on the far left in FIG. 6. For each of the eight possible phase steps, an associated coefficient is in each case selected from the coefficient memories 13a–13d. By way of example, in the case of the phase step 001, the coefficient $a_2$ is selected for the multiplier 11a, the coefficient $b_2$ is selected for the multiplier 11b, the coefficient $c_2$ is selected for the multiplier 12c and the coefficient $d_2$ is selected for the multiplier 12d. In the case of the last and seventh phase step 111, the set of coefficients $a_8$, $b_8$, $c_8$ and $d_8$ is selected. The two polyphase filters 5a and 5b in each case interpolate at adjacent interpolation instants, as can be seen from FIG. 5.

A special feature occurs if the polyphase filter 5a interpolates at the last phase step of a sampling interval of the intermediate signal sequence z(k), that is to say at the seventh phase step 111 in the example, but the polyphase filter 5b already interpolates at the first phase step 000 of the succeeding next sampling interval of the intermediate signal sequence z(k). In the exemplary embodiment illustrated in FIG. 7, this problem is solved in that the coefficient 0 for the first phase step 000, for which there is no phase shift relative to the last sample of the intermediate signal sequence, is in each case read from the coefficient memories 13a–13d. However, the next sample z(k+1) of the intermediate signal sequence is accessed via the changeover devices 9a–9d. It can be seen from FIG. 6 that the coefficients of the polyphase filter 5b are cyclically shifted in each case by one phase step relative to the coefficients of the polyphase filter 5a, i.e. if the polyphase filter 5a is allocated the set of coefficients $a_8$, $b_8$, $c_8$, and $d_8$, the polyphase filter 5b is already allocated the set of coefficients 0,1,0,0.

The outputs of the multipliers 11a–11d are fed to a summer 14 in a customary manner. The output 15 of the summer 14 is connected to the linear interpolation filter 6.

Figure 8:
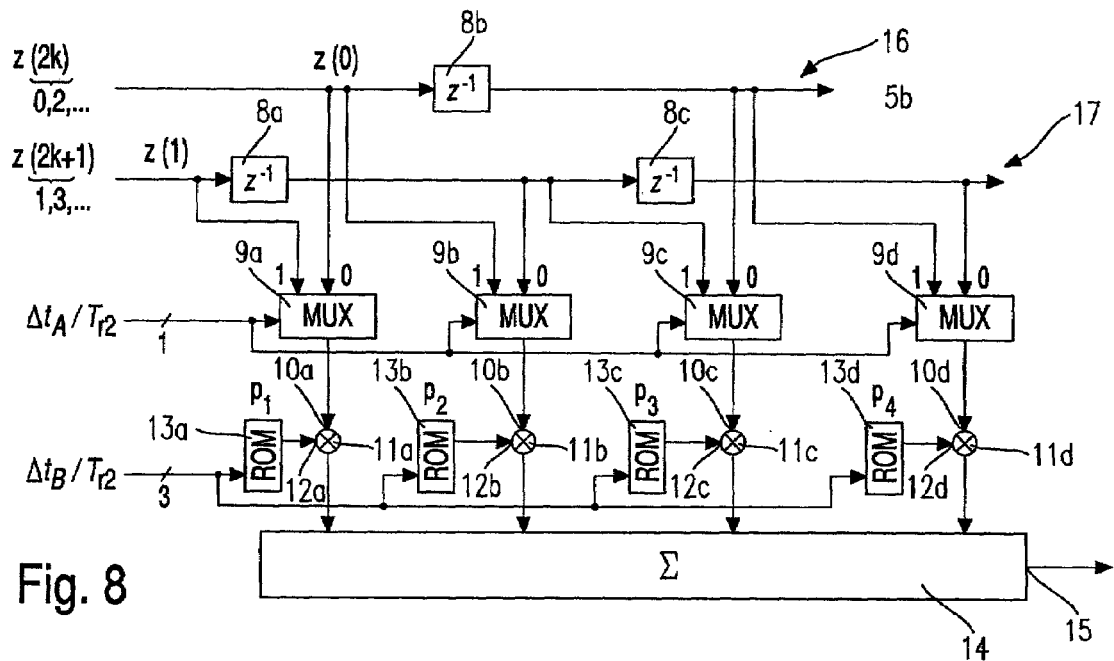
FIG. 8 illustrates a block diagram of a second exemplary embodiment of a polyphase filter of the interpolator according to the present invention.

FIG. 8 shows a second exemplary embodiment of the polyphase filters 5a and 5b, respectively. The sampling rate $f_{r2}$ of the intermediate signal sequence z(k) is twice as large as the sampling rate $f_{r1}$ of the input signal sequence x(k). The exemplary embodiment of the polyphase filters 5a and 5b which is illustrated in FIG. 7 would therefore have to be operated at twice the clock rate. It is advantageous, however, to use a uniform clock rate in the interpolator 1. In order to achieve this, in the exemplary embodiment illustrated in FIG. 8, the delay elements 8a, 8b, 8c . . . are arranged in two series 16 and 17, respectively. The odd-numbered output values of the first half band filter 3, that is to say the odd-numbered values z(2k+1) of the intermediate signal sequence, are fed to the first series 17 of delay elements 8a, 8c . . . By contrast, the even-numbered output values of the first half band filter 3, that is to say the even-numbered values z(2k) of the intermediate signal sequence, are fed to the second series 16 of delay elements 8b . . . The two series 16 and 17 of delay elements 8a, 8b, 8c can then be clocked with the clock $f_{r1}$. Since the values of the intermediate signal sequence z(k) are in each case allocated alternately to the two series 16 and 17, the connection allocation of the changeover elements 9a–9d is to be modified in the manner illustrated in FIG. 8. In each case one input of the changeover devices 9a–9d is connected to the first series 17 and the other input of the changeover devices 9a–9d is connected to the second series 16.

Figure 9:
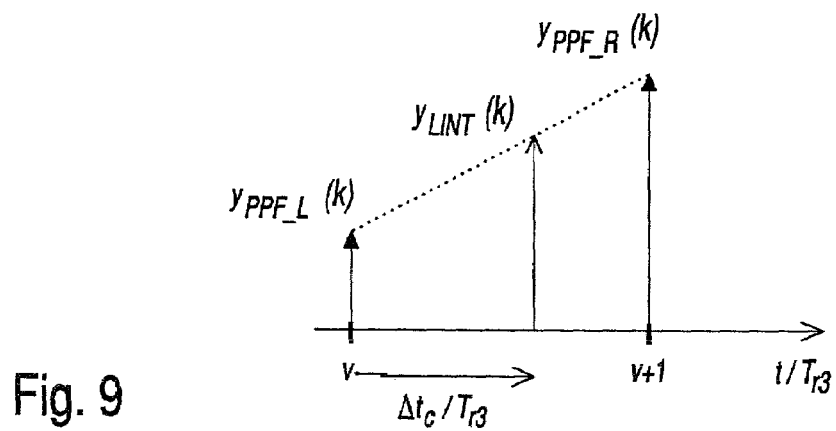
FIG. 9 illustrates a diagram for elucidating the linear interpolation.

FIG. 9 shows the procedure in the linear interpolation filter 6. The polyphase filter 5a generates the interpolation value $y_{PPF\_L}(k)$. The polyphase filter 5b generates the interpolation value $y_{PPF\_R}(k)$. The polyphase filter 5b generates the interpolation value $y_{LINT}(k)$. The linear interpolation filter 6 interpolates in accordance with the time offset $\Delta t_c/T_{r3}$ that still remains (cf. FIGS. 5 and 9), as a result of which the final interpolation value $y_{LINT}(k)$ is obtained.

In the interpretation of the control signal S, the procedure may be such that the most significant bit decides whether the interpolation is performed in the first half or in the second half of the sampling interval $T_{r1}$, a series of medium significant bits define the phase step of the polyphase filters 5a and 5b and the least significant bits not yet taken into account drive the linear interpolation filter 6.

The present invention is not restricted to the exemplary embodiment illustrated and can also be used e.g. in other embodiments of the polyphase filters 5a and 5b.

What is claimed is:

1. An interpolator which interpolates a digital input signal sequence (x(k)) at interpolation instants ($\Delta t/T_{r1}$) prescribed by a control signal (S) for the purpose of generating a digital output signal sequence (y(k)), comprising:
   a first half band filter, which interpolates the input signal sequence (x(k)) in each case in a center of each sampling period ($T_{r1}$) of the input signal sequence (x(k)) and thus generates an intermediate signal sequence (z(k));
   a first polyphase filter, which interpolates the intermediate signal sequence (z(k)) at an instant ($t_L$) which lies in a predetermined pattern of possible interpolation instants before the interpolation instant ($\Delta t/T_{r1}$) prescribed by the control signal(S);
   a second polyphase filter, which interpolates the intermediate signal sequence (z(k)) at an instant ($t_R$) which lies in a predetermined pattern of possible interpolation instants after the interpolation instant ($\Delta t/T_{r1}$) prescribed by the control signal (S); and
   a linear interpolation filter, which carries out a linear interpolation between interpolation values ($y_{PPF\_L}(k)$, $y_{PPF\_R}(k)$) of the first and second polyphase filters in a manner dependent on a position of the interpolation instant ($\Delta t/T_{r1}$) prescribed by the control signal (S) relative to the interpolation instants ($t_L$, $t_R$) of the first and second polyphase filters.

2. The interpolator as claimed in claim 1, wherein at least one second half band filter is connected upstream of the first half band filter, and performs band limiting to a frequency range in which a transfer function ($H_2(f)$) of the first half band filter is approximately constant.

3. The interpolator as claimed in claim 2, wherein the polyphase filters in each case have a series of a plurality of serially arranged delay elements and a plurality of multipliers, whose first input can be connected via in each case an assigned changeover device to an input or to an output of an assigned delay element.

4. The interpolator as claimed in claim 2, wherein the polyphase filters in each case have a first series of a plurality of serially arranged delay elements, to which odd-numbered values (z(2k+1)) of the intermediate signal sequence are fed, a second series of a plurality of serially arranged delay elements, to which even-numbered values (z(2k)) of the intermediate signal sequence are fed, and a plurality of multipliers, whose first input can be connected via in each case an assigned changeover device to a delay element of one of the first series and the second series.

5. The interpolator as claimed in claim 1, wherein the polyphase filters in each case have a series of a plurality of serially arranged delay elements and a plurality of multipliers, whose first input can be connected via in each case an assigned changeover device to an input or to an output of an assigned delay element.

6. The interpolator as claimed in claim 1, wherein the polyphase filters in each case have a first series of a plurality of serially arranged delay elements, to which odd-numbered values (z(2k+1)) of the intermediate signal sequence are fed, a second series of a plurality of serially arranged delay elements, to which even-numbered values (z(2k)) of the intermediate signal sequence are fed, and a plurality of multipliers, whose first input can be connected via in each case an assigned changeover device to a delay element of one of the first series and the second series.

7. The interpolator as claimed in claim 5, wherein a second input of the multipliers is connected to a coefficient memory, which, in a manner dependent on the control signal (S), selects a coefficient (a; b; c; d) associated with the interpolation instant ($t_L$; $t_R$) for a respective changeover device.

8. The interpolator as claimed in claim 6, wherein a second input of the multipliers is connected to a coefficient memory, which, in a manner dependent on the control signal (S), selects a coefficient (a; b; c; d) associated with the interpolation instant ($t_L$; $t_R$) for a respective changeover device.

9. An interpolation method for generating a digital output signal sequence (y(k)) by interpolation of a digital input signal sequence (x(k)) at interpolation instants ($\Delta$)t/$T_{r1}$ prescribed by a control signal (S), comprising:

interpolating the input signal sequence (x(k)) in each case in a center of each sampling period ($T_{r1}$) of the input signal sequence (x(k)), and thus generating an intermediate signal sequence (z(k));

interpolating the intermediate signal sequence (z(k)) in a first polyphase filter at a first instant ($t_L$), which lies in a predetermined pattern of possible interpolation instants before the interpolation instant ($\Delta$)t/$T_{r1}$) prescribed by the control signal (S), and thus generating in each case a first interpolation value ($y_{PPF\_L}(k)$);

interpolating the intermediate signal sequence (z(k)) in a second polyphase filter at a second instant ($t_R$), which lies in a predetermined pattern of possible interpolation instants after the interpolation instant ($\Delta$)t/$T_{r1}$) prescribed by the control signal (S), and thus generating a second interpolation value ($y_{PPF\_R}(k)$); and linear interpolating the first and second interpolation values ($y_{PPF\_L}(k)$, $y_{PPF\_R}(k)$), in a manner dependent on the position of the interpolation instant ($\Delta$)t/$T_{r1}$) prescribed by the control signal (S) relative to the first and second instants ($t_L$, $t_R$).

10. The interpolation method as claimed in claim 9, wherein in the case where the second instant ($t_R$) coincides with a sampling instant of the intermediate signal sequence (z(k)), the interpolation for generating the second interpolation value ($y_{PPF\_R}(k)$) is effected on the basis of an intermediate signal sequence (z(k+1)) shifted by a sampling period ($T_{r2}$).

* * * * *